(12) United States Patent (10) Patent No.: US 12,557,959 B2
Haug et al. (45) Date of Patent: Feb. 24, 2026

(54) CREATION OF A MAP OF THE SURROUNDINGS

(71) Applicant: BSH Hausgeraete GmbH, Munich (DE)

(72) Inventors: Sebastian Haug, Leinfelden-Echterdingen (DE); Maximilian Fremerey, Saal an der Saale (DE); Marco Lampacrescia, Stuttgart (DE)

(73) Assignee: BSH Hausgeraete GmbH, Munich (DE)

(*) Notice: Subject to any disclaimer, the term of this patent is extended or adjusted under 35 U.S.C. 154(b) by 545 days.

(21) Appl. No.: 17/922,433

(22) PCT Filed: May 11, 2021

(86) PCT No.: PCT/EP2021/062497
§ 371 (c)(1),
(2) Date: Oct. 31, 2022

(87) PCT Pub. No.: WO2021/233738
PCT Pub. Date: Nov. 25, 2021

(65) Prior Publication Data
US 2023/0190064 A1 Jun. 22, 2023

(30) Foreign Application Priority Data

May 20, 2020 (DE) .................... 10 2020 206 355.9

(51) Int. Cl.
*A47L 11/40* (2006.01)
*G01S 17/89* (2020.01)
*G05D 1/00* (2006.01)

(52) U.S. Cl.
CPC ........... *A47L 11/4011* (2013.01); *G01S 17/89* (2013.01); *G05D 1/0248* (2013.01); *G05D 1/0274* (2013.01); *A47L 2201/04* (2013.01)

(58) Field of Classification Search
CPC .. A47L 11/4011; A47L 2201/04; G01S 17/89; G01S 17/88; G01S 17/894;
(Continued)

(56) References Cited

U.S. PATENT DOCUMENTS 6,427,082 B1 * 7/2002 Nordstrom ........... A61B 5/0071
356/342
10,885,351 B2 * 1/2021 Motohashi ........... G05D 1/0246
(Continued)

FOREIGN PATENT DOCUMENTS

DE 102018217000 A1 4/2020
EP 3514493 A1 7/2019

OTHER PUBLICATIONS

Belter Dominik et al, "Keyframe-based Local Normal Distribution Transform Occupancy Maps for Environment Mapping", 2018 IEEE 23rd International Conference on Emerging Technologies and Factory Automation (ETFA), IEEE, vol. 1, Sep. 4, 2018 (Sep. 4, 2018), pp. 706-712, XP033426003, DOI: 10.1109/ETFA.2018. 8502517 external link, the whole document.

*Primary Examiner* — Ramya P Burgess
(74) *Attorney, Agent, or Firm* — Laurence A. Greenberg; Werner H. Stemer; Ralph E. Locher

(57) ABSTRACT

A map of the surroundings for a motorized domestic appliance is created by transmitting signals and allocating reflections to points. A local distribution of the points is formed. Points are discarded if a correspondence of the distribution to a straight line fails to reach a predefined degree. In a second variant, points whose distance from an average location exceeds a predefined value are discarded. The surroundings may be divided into tiles. A normal distribu-
(Continued)

tion transformation for the points of a tile specifies an average location and a variance of the points. The variance has two eigenvectors in two dimensions, each with an eigenvalue describing the variance contained in the eigenvector. A ratio between the larger and smaller eigenvalues describes an equal or unequal distribution of the variances. If, however, the quotient is, say, 10 or more, a large number of points of the tile can lie along a straight line.

12 Claims, 4 Drawing Sheets

(58) Field of Classification Search
CPC .... G01S 17/93; G01S 17/931; G01S 1/00–82;
G01S 13/88; G01S 13/881; G01S 13/89;
G01S 13/93; G01S 13/931; G05D 1/0248;
G05D 1/0274; G05D 1/00–87; G01C
21/1652
See application file for complete search history.

(56) References Cited

U.S. PATENT DOCUMENTS

| | | | |
|---|---|---|---|
| 11,020,860 B2* | 6/2021 | Cheuvront | G06F 16/00 |
| 2005/0036689 A1* | 2/2005 | Mahdavieh | G01V 5/20 |
| | | | 382/199 |
| 2007/0293985 A1 | 12/2007 | Myeong et al. | |
| 2012/0106829 A1 | 5/2012 | Lee et al. | |
| 2013/0138246 A1 | 5/2013 | Gutmann et al. | |
| 2016/0132056 A1 | 5/2016 | Yoshino | |
| 2018/0149753 A1 | 5/2018 | Shin et al. | |
| 2018/0253107 A1 | 9/2018 | Heinla et al. | |
| 2019/0035099 A1 | 1/2019 | Ebrahimi Afrouzi et al. | |
| 2020/0019165 A1* | 1/2020 | Levandowski | G06N 3/082 |
| 2020/0132822 A1* | 4/2020 | Pimentel | G01S 17/89 |

* cited by examiner

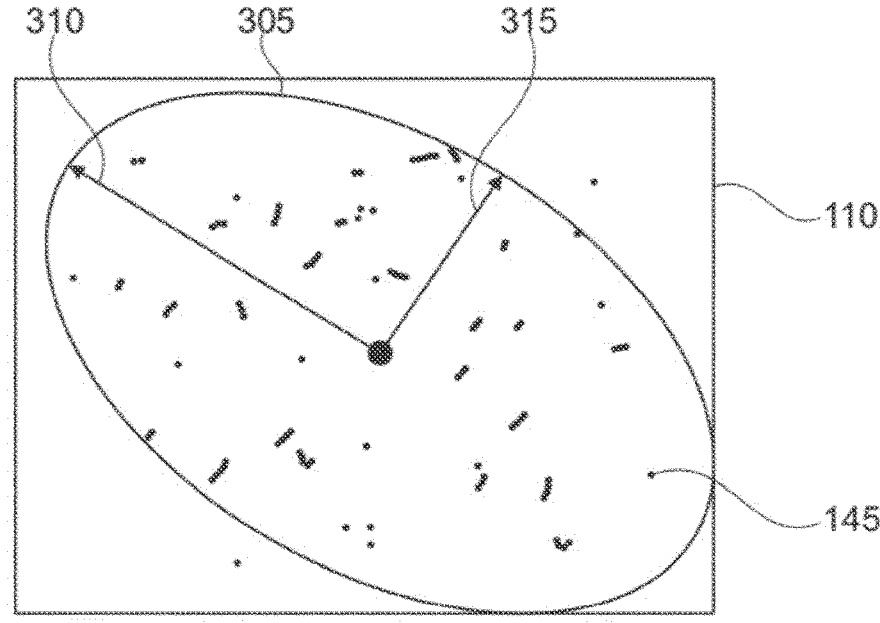
Fig. 3a
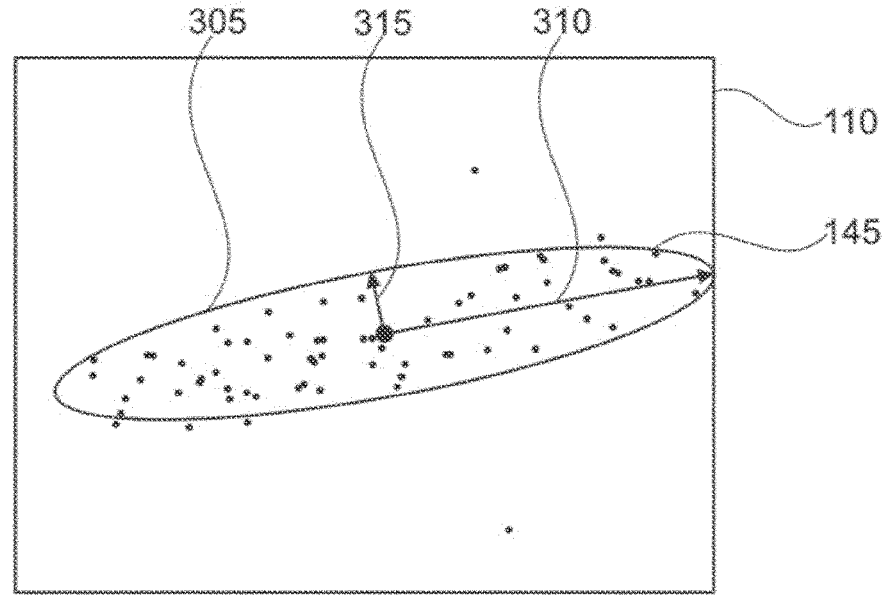
Fig. 3b
Fig. 3

CREATION OF A MAP OF THE SURROUNDINGS

FIELD AND BACKGROUND OF THE INVENTION

The invention relates to the creation of a map of the surroundings for a mobile household appliance. In particular, the invention relates to removing incorrect measurements.

A floor cleaning robot is configured so as to be used in a household, by way of example in a house or in an apartment. The robot can move independently and has sensors for scanning its surroundings. One sensor can detect a collision with an obstacle, another sensor can render it possible for the surroundings to be scanned in a contactless manner.

In order to render possible a planned approach to cleaning the floor, the robot requires a map of the surroundings that indicates which areas of the floor are accessible to it and which are not. The map of the surroundings can be created by the robot moving through the apartment or the house and in so doing scanning the surroundings in a contactless manner. The position of the robot can be determined simultaneously by means of a SLAM method (simultaneous localization and mapping) and obstacles that are detected by the robot can be mapped.

Sensors that operate in particular in a contactless manner, such as radar sensors or LiDAR sensors, can encourage so-called phantom points in the surroundings of the robot at which an obstacle appears to be located but at which in actual fact the area is clear. Such a measurement noise can be caused in particular by a bright light or in the vicinity of an obstacle made from a transparent or poorly reflective material. Erroneous measurements frequently occur close to a boundary of an actual obstacle. This effect is also called "mixed pixel effect".

SUMMARY OF THE INVENTION

An object underlying the present invention consists in specifying an improved technology for removing phantom points from measurement data of a contactless sensor in order to render possible improved mapping and/or improved position determination of a household appliance. The invention achieves this object by means of the subject matter of the independent claims. Subordinate claims disclose preferred embodiments.

According to one aspect of the present invention, a first method for creating a map of the surroundings for a mobile household appliance comprises the steps of transmitting a measurement signal into the surroundings of the household appliance and receiving reflections of the measurement signal; determining points in the surroundings which are allocated a reflection of the measurement signal; determining a spatial distribution of the points in the surroundings; discarding points if the distribution corresponds less than predetermined to a straight line; and creating the map of the surroundings on the basis of the remaining points.

It has been recognized that, above all, points that form a straight line are of interest for the household appliance. The straight line can comprise a boundary of an obstacle, by way of example a wall or a piece of furniture. By discarding points that correspond less than predetermined to a straight line, it is possible to efficiently remove phantom measurements from the measurement data. Positioning of the household appliance and/or mapping surroundings can only be improved based on correct measurements, with the result that determining quality or determining reliability can be improved.

The surroundings can be divided into tiles of a predetermined size, wherein it is preferred that points in a tile are discarded if the spatial distribution of the points of the tile corresponds less than predetermined to a straight line. A tile can have by way of example a size of approx. 100×100 cm; other sizes are however also possible. The tiles can adjoin one another on all sides, with the result that the surroundings can be covered by tiles without any gaps. It is likewise possible for adjacent tiles to overlap one another, for example by in each case 50%.

According to a second aspect of the invention, a second method for creating a map of the surroundings for a mobile household appliance comprises the steps of transmitting a measurement signal into the surroundings of the household appliance and receiving reflections of the measurement signal; determining points in the surroundings which are allocated a reflection of the measurement signal; determining a spatial distribution of the points in the surroundings; discarding points whose distance to an average location of the points exceeds a predetermined value; and creating the map of the surroundings on the basis of the remaining points.

As a result, it is possible in particular to retain points that form a dense structure. In contrast, individual points that lie remote from most of the other points can be discarded. By suitably selecting the predetermined value, it is possible in particular to effectively remove phantom points that are located close to an actual obstacle but are not part of the obstacle.

The two methods can be integrated with one another. In a first variant, a check is initially performed as to whether points of whole tiles are to be discarded, and only subsequently to check whether individual points are to be discarded. In a second variant, the test criteria can be applied in a reverse sequence.

The surroundings can be divided into tiles of a predetermined size, as described above. It is possible to discard a point that is allocated to a tile if its distance to an average location of the points of the tile exceeds the predetermined value. The average location always lies on the tile and indicates the statistical average of the locations of points comprised by the tile.

In a particularly preferred embodiment of the invention described herein, a normal distribution transformation NDT is determined for a predetermined number of points. The NDT indicates an average location of the points and the variance of the points. The first test that can lead to all the checked points being discarded and the second test that can lead to individual points being discarded can be advantageously easily applied in relation to the NDT. In so doing, the NDT can be determined with a manageable outlay for a number of points. It is particularly preferred to determine NDTs in each case for the points of a tile, as described herein.

The points are usually determined in each case in two dimensions, wherein the dimensions usually lie in a horizontal plane in relation to the household appliance. The variance of a number of points then includes two eigenvectors. In general, the variance includes as many eigenvectors as the comprised points have dimensions. It is possible to determine an eigenvalue for each eigenvector of the variance. The points under consideration can be discarded if a relationship between the larger and the smaller of the eigenvalues deviates more than predetermined from one.

The points under consideration are essentially organized more according to a type of a straight line if the relationship is significantly different from one. Typically, the said relationship in the case of a straight line in the tile amounts to multiple 100, multiple 1000 or even more. If the eigenvalues are of a very similar size, the relationship can be close to one. If for example there is no obstacle in the area under consideration, the relationship can drop to below 10, below 2 or even below 1.1.

In a further embodiment, the points of a tile can be discarded if one of the eigenvalues exceeds or is below a predetermined value. For example, it is possible to determine whether the smaller of the eigenvalues is below a predetermined minimum value or exceeds a predetermined maximum value. In a corresponding manner, it is also possible to check whether the larger of the eigenvalues is below a predetermined minimum value or exceeds a predetermined maximum value. As a result, it is also possible to advantageously evaluate further indices that indicate a measurement which has a substantial amount of noise. This test can be performed in particular in addition to the above-described consideration of the relationship of the eigenvalues.

The distance can be determined on the basis of the Mahalanobis distance of the point to the average point. This distance is defined between points in a multi-dimensional vector space and intuitively indicates the distance of the points in standard deviations. The Mahalanobis distance can be determined in a simple manner and is significant in the vector space under consideration.

According to a third aspect of the invention, a first appliance for determining a map of the surroundings for a mobile household appliance comprises a transmission facility for transmitting a measurement signal into the surroundings of the household appliance; a receive facility for receiving reflections of the measurement signal; and a processing facility. In this case, the processing facility is configured so as to determine points in the surroundings which are allocated a reflection of the measurement signal; to determine a spatial distribution of the points in the surroundings; to discard the points if the distribution corresponds less than predetermined to a straight line; and to determine the map of the surroundings on the basis of remaining points.

According to a further aspect of the invention, a second apparatus for determining a map of the surroundings for a mobile household appliance comprises a transmission facility for transmitting a measurement signal into the surroundings of the household appliance; a receive facility for receiving reflections of the measurement signal; and a processing facility. In this case, the processing facility is configured so as to determine points in the surroundings which are allocated a reflection of the measurement signal; to determine a spatial distribution of the points in the surroundings; to discard points whose distances to an average location of the points exceed a predetermined value; and to determine the map of the surroundings on the basis of remaining points.

The two apparatuses can also be integrated with one another with the result that the processing facility is configured so as to discard the points under consideration if the distribution corresponds less than predetermined to a straight line; and to discard individual points whose distances to an average location of the points exceed a predetermined value.

The processing facility of one of the apparatuses can be configured so as to perform completely or in part one of the methods described herein. It is preferred that the processing facility of the first apparatus is configured so as to perform the first method; the processing facility of the second apparatus can be configured so as to perform the second method. For this purpose, one of the processing facilities can comprise a programmable microcomputer or microcontroller and the method can be in the form of a computer program product having program code means. The computer program product can also be stored on a computer-readable data carrier. Features or advantages of the method can be transferred to the apparatuses and conversely.

In a preferred embodiment, on one of the apparatuses the transmission facility and the receive facility are comprised by a LiDAR sensor. The LiDAR sensor can measure in particular in the horizontal direction and can have a detection angle of up to $360_i$. In a first variant, said LiDAR sensor operates according to the time-of-flight (TOF) principle, in that the distance to the point on an obstacle is determined on the basis of the time between the transmission of light and the arrival of the reflected light on the obstacle and said distance is multiplied by the propagation speed of light. As an alternative thereto, the sensor can use a correlation of a modulated emitted signal with a received signal in order to determine the distance to a reflection point. In this case, it is possible to use multiple modulation frequencies in order to increase the explicit measurement range. In a second variant, the sensor operates according to the triangulation principle, wherein it is configured so as to determine the direction of a point at an obstacle in relation to the angle direction of the point from two mutually spaced locations. The two variants can be cost-effective and make available a sufficiently precise scan of the surroundings of a typical household appliance.

According to a further aspect of the invention, the household appliance comprises a floor cleaning robot having one of the apparatuses that are described herein. The floor cleaning robot can be configured so as to clean the floor area of a household, for example by means of a pneumatic suction facility or a facility for wet cleaning. In a further embodiment, the household appliance can include practically any type of mobile ground-based robots, for example also a robot lawnmower or a surveillance robot.

BRIEF DESCRIPTION OF THE FIGURES

The invention is now described in detail with reference to the attached figures, in which:

FIG. 3 shows exemplary variances; and

DETAILED DESCRIPTION OF THE INVENTION

Figure 1:
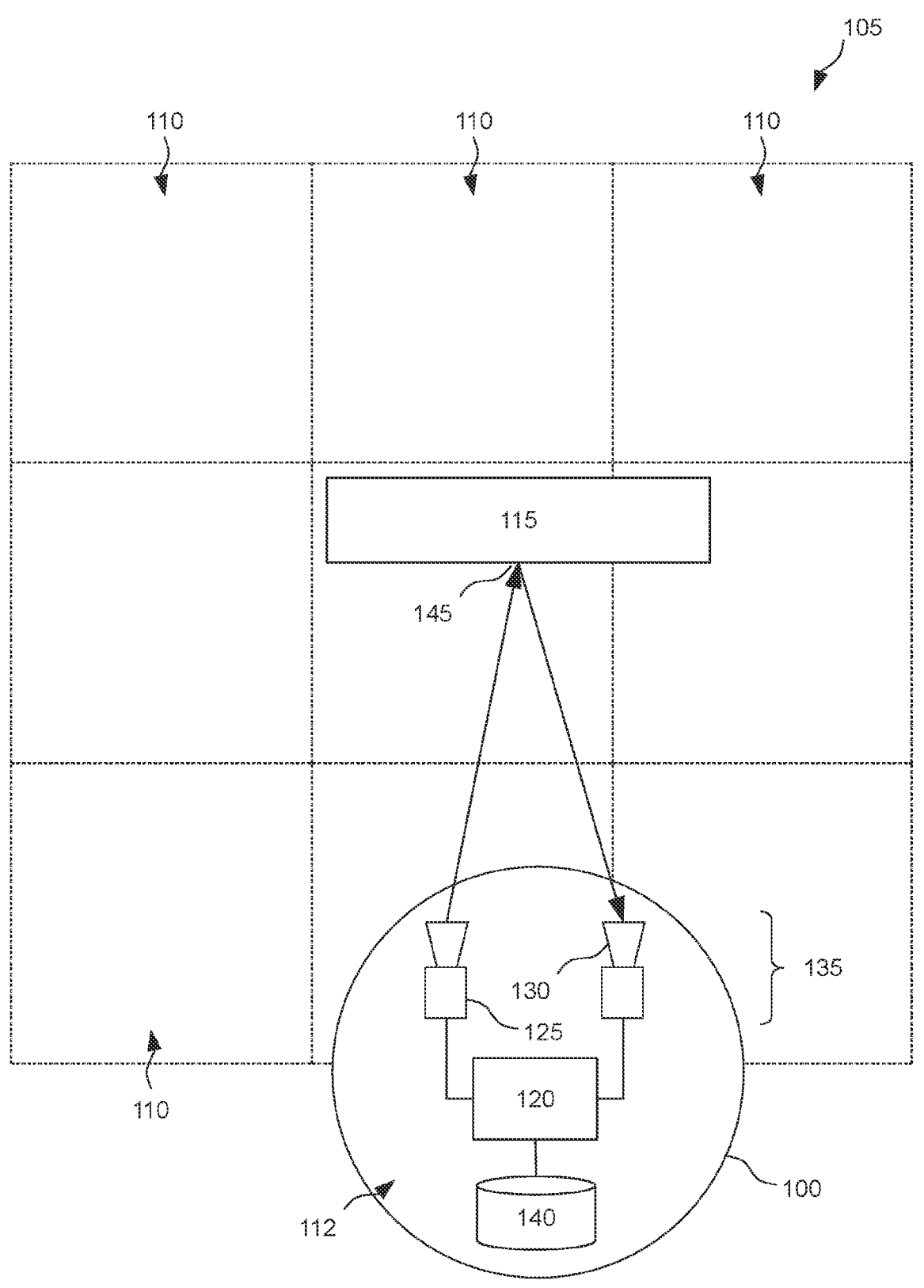
FIG. 1 shows a mobile household appliance in a household.

FIG. 1 illustrates a mobile household appliance 100 in surroundings 105. The household appliance 100 can include in particular a floor treating machine, by way of example a robot vacuum cleaner. The household appliance 100 is configured so as to be used in a household, in that it can move independently over a ground surface. The surroundings 105 can comprise a section of the household or the entire household. The surroundings 105 can be divided into individual sections that are indicated by dashed lines in FIG. 1 as square tiles 110 adjacent to one another. The tiles 110 are preferably arranged as illustrated like a chess board;

however a different division of the ground area is also possible. A mutual overlapping of adjacent tiles 110 is not illustrated for better understanding but it can be used in practice and in each case amount to approx. 50% of the area of a tile 110.

The household appliance 100 usually comprises one or multiple components, not illustrated, such as an energy supply, a drive motor, a wireless communication facility, a facility for treating a ground surface or a collision sensor. Furthermore, the household appliance 100 comprises an apparatus 112 that comprises a processing facility 120 that is connected to a transmission facility 125 and to a receive facility 130. The transmission facility 125 and the receive facility 130 can be comprised by a common sensor 135 that can be designed in particular as a LiDAR sensor. The transmission facility 125 is configured so as to transmit a measurement signal, in particular light, into the surroundings 105, and the receive facility 130 is configured so as to receive the signal that is reflected at the obstacle 115. Optionally, the apparatus 112 comprises moreover a storage device 140 for storing a surroundings map of the surroundings 105. On the basis of the map of the surroundings the household appliance 100 can navigate in its surroundings 105 and where appropriate move autonomously.

The processing facility 120 is configured so as to determine the map of the surroundings on the basis of points 145 that have been detected by means of the sensor 135 in the surroundings 105. A point 145 is usually located at a location in the surroundings 105 at a boundary of an obstacle 115. The measurement signal of the transmission facility 125 is reflected at the point 145 in such a manner that it falls into the receive facility 130. A distance and a direction of the point 145 in relation to the household appliance 100 can be determined on the basis of the transmitted and the received signal, by way of example by means of triangulation or on the basis of a transmission direction and the time between the measurement signal being transmitted and received. It is thus possible to determine the location of the point 145 in relation to the household appliance 100. If a position of the household appliance 100 in the surroundings 105 is known, then it is possible to determine the location of the point 145 in the surroundings 105.

Measurement noises or interference can cause the sensor 135 to determine a point 145 that does not actually lie at an obstacle 115. By way of example, a reflection can occur at an object that does not lie in the movement area of the household appliance 100 or the signal that is detected by the receive facility 130 does not relate to a simple reflection of the measurement signal that is transmitted by the transmission facility 125 but rather, by way of example, it relates to sunlight or to a multiple reflection of the measurement signal. Such a determined point 145 is also called a phantom point.

The processing facility 120 is preferably configured so as to perform a SLAM method in order to determine on the one hand the position of the household appliance in the surroundings 105 and on the other hand the map of the surroundings. It is proposed to check determined points 145 with regard to whether they are phantom points. Phantom points can be discarded and the determination of the map of the surroundings and/or of the position can be improved based on points 145 that are not phantom points.

Figure 2:
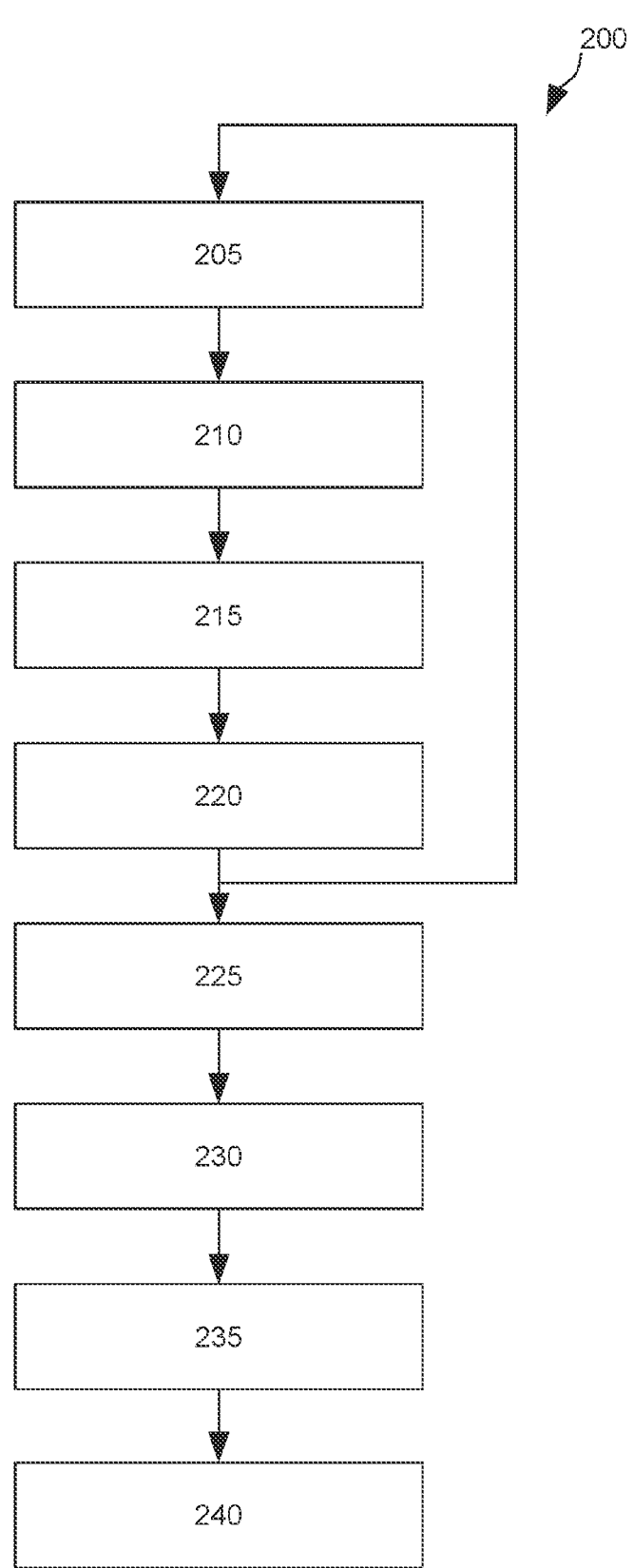
FIG. 2 shows a flow diagram of a method.

FIG. 2 illustrates a flow diagram of a method 200 for checking determined points 145. The method 200 can be performed in particular on board a household appliance 100, preferably by means of a processing facility 120. A sequence in which the illustrated steps are performed can be varied. It is possible to form different methods 200 by omitting steps, in particular precisely one of the steps 230 or 235.

In a step 205, a measurement signal can be transmitted by means of the transmission facility 125. If the sensor 135 is by way of example a LiDAR sensor, the measurement signal can include light; in the case of a radar sensor 135 the measure signal can include radar waves and in the case of an ultrasound sensor the measurement signal can include sound waves. Other types of sensors 135 can use other measurement signals. In a step 210, a signal can be received by means of the receive facility and said signal can include in particular a reflection of the previously transmitted measurement signal.

In a step 215, it is possible to determine a location in the surroundings 105 of the household appliance 100 at which the intended reflection of the received signal has occurred. A point 145 can be determined at the determined location. However, it is not initially clear whether the point 145 is actually part of an obstacle 115 or is a phantom point which is not allocated an obstacle 115. In a step 220, the point 145 can be allocated to a tile 110 on account of its location. The allocation of points 145 to tiles 110 has the advantage that it is not always necessary to process all the points 145 that can be detected from a position of the household appliance 100 but rather only to process such points that are in a predetermined spatial context.

The steps 205 to 220 can be carried out numerous times in order to perform a multiplicity of scans of the surroundings 105, which can lead to a multiplicity of points 145 that can lie in different tiles 110. The household appliance 100 can be stationary during the scanning or it can move over the ground area of the surroundings 105.

In a step 225, it is possible to determine a normal distribution transformation NDT (normal distribution transform) for the points of a tile 110. The NDT has been proposed by Peter Biber and Wolfgang Straßer, University of Tübingen, in "The Normal Distributions Transform: A New Approach to Laser Scan Matching" and includes a normal distribution of points 145 that reflects a local probability of determining a point 145.

The NDT can be determined as follows for tiles 110 that have at least three points 145:
1) Collect all points $x_{i=1 \ldots n}$ in the tile 110;
2) Determine an average location $$q = \frac{1}{n} \sum_i x_i$$

3) Determine the covariance matrix $$\sum = \frac{1}{n} \sum_i x_i (x_i - q)(x_i - q)^t.$$

The probability of determining a point 145 at the two dimensional point x of the tile 110 under consideration can then be modeled by the normal distribution $$N(q, \sum): p(x) \sim \exp\left(-\frac{(x - q)^t \sum^{-1} (x - q)}{2}\right).$$

As a result, it is possible to specify a section-by-section continuous and differentiable description of the two-dimensional (horizontal) plane in the form of a probability density. Further details for the determination are apparent in the mentioned publication.

In a step 230, it is possible to determine whether the tile 110 has mainly noisy points 145. This can be the case in particular if the points 145 do not form a straight line in the tile 110. The determined NDT includes the average location q and a variance of the points 145 comprised by the tile 110. In the two dimensional, the variance includes two eigenvectors for which it is possible in each case to determine an eigenvalue. An eigenvalue describes in this case how much variance is included in this eigenvector. A quotient of the larger eigenvalue, divided by the smaller eigenvalue describes whether the variances are distributed rather equally or unequally. If they are equally distributed then the quotient is close to one and the tile 110 does not comprise a straight line along which points 145 accumulate. If, on the other hand, the quotient is by way of example 10 or more (typically multiple orders of magnitude more than one), it is then significantly possible for many points 145 of the tile 110 to lie along a straight line. In the step 230, it is possible to determine whether the quotient is closer than a predetermined measurement to one. If this is the case, then the points 145 of the tile 110 under consideration can be discarded. Otherwise the points 145 of the tile 110 can be retained.

In a step 235, it is possible to determine for individual points 145 of a tile 110 in each case whether they are closer than a further predetermined measurement at the average location q. This check is preferably performed for all points 145 of a tile 110. In this case, the distance between a point 145 and the average location q can be determined as a Mahalanobis distance. If the determined distance exceeds the further predetermined measurement, then the point 145 can be discarded; otherwise it can be retained.

In a step 240, it is possible on the basis of the points 145 that are not discarded to determine a position of the household appliance 100 and/or the obstacle 115. The obstacle 115 can be entered into the map of the surroundings, wherein already existing information regarding the obstacle 115 can be taken into consideration.

FIG. 3 illustrates by way of example variances 305 of points 145 in tiles 110.

FIG. 3a illustrates a variance 305 that corresponds to points 145 that are distributed as a general tendency equally in a tile 110. A first eigenvector 310 and a second eigenvector 315 (which are perpendicular to one another) have similar eigenvalues, visible on the similar lengths of the eigenvectors 315. A quotient of these eigenvalues is close to one.

FIG. 3b illustrates a variance 305 that corresponds to points 145 that as a general tendency lie on a straight line. A first eigenvector 310 and a second eigenvector 315 have different eigenvalues, visible at the different lengths of the eigenvectors 315, and the quotient of the eigenvalues differs greatly from one.

FIG. 4 illustrates by way of example scans of a surroundings 105 that encompass an exemplary household. The dark background represents in a plan view a ground area under consideration, a division into tiles 110 is not illustrated. Each determined point 145 is illustrated by a bright spot.

Figure 4A:
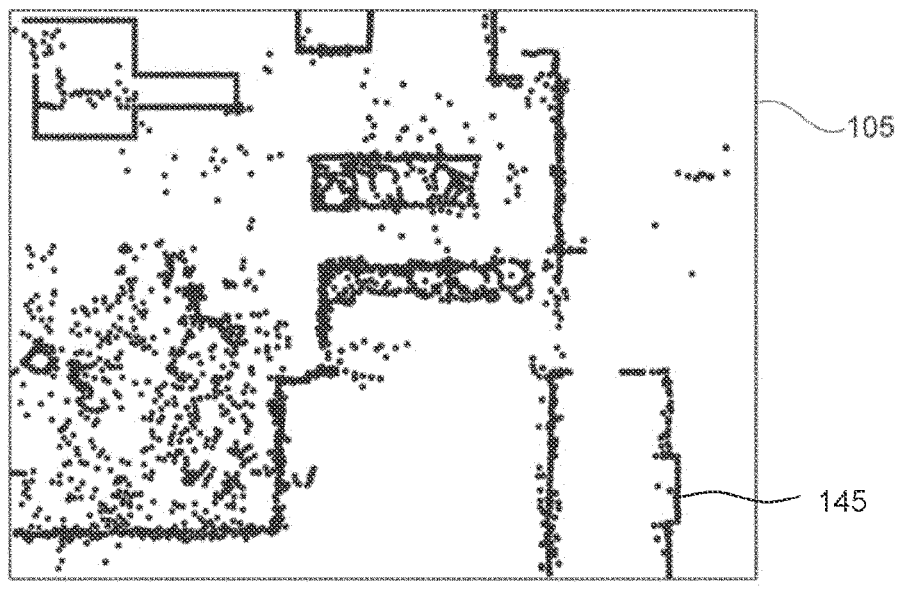
FIG. 4 shows exemplary scans of a household appliance.
Figure 4B:
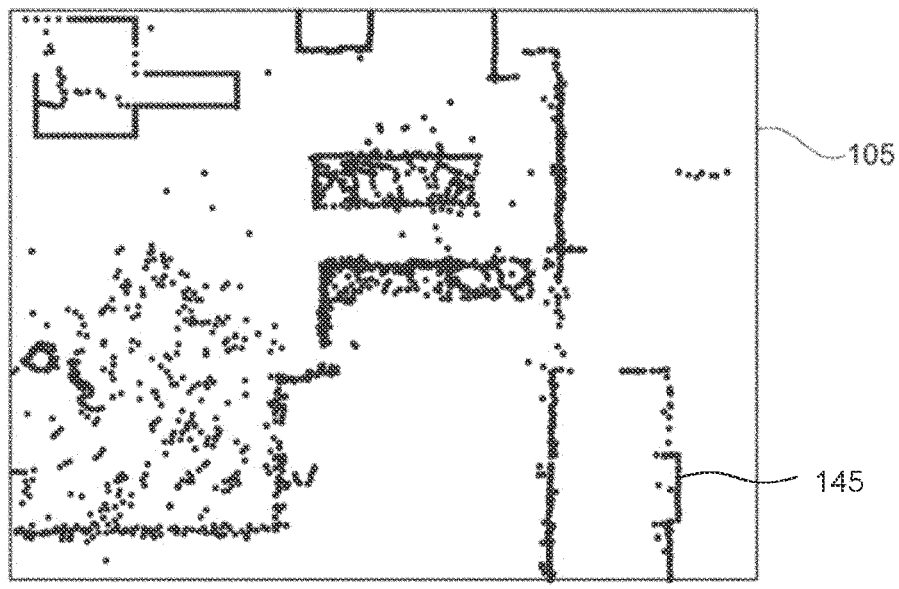

FIG. 4a illustrates points 145 in the surroundings 105 prior to discarding; FIG. 4b after discarding points 145 that have been determined as phantom points. The points can be discarded in particular after the steps 230 and 235 of the method 200 in FIG. 2.

Although the scan in FIG. 4b obviously includes only a few points 145 less than the scan in FIG. 4a, edges of obstacles 115 are still clearly apparent at the points 145 accumulating along them.

Individual points 145 that are visible in the scan in FIG. 4a close to an edge of an obstacle 115 but without being part of the edge are significantly reduced in the second scan in FIG. 4b. This effect can be caused in particular by the step 235.

Furthermore, in the scan in FIG. 4b free areas between obstacles 115 have significantly fewer individual points 145. This effect can be caused in particular by the step 230.

REFERENCE CHARACTERS

100 Household appliance
105 Surroundings
110 Tile
112 Apparatus
115 Obstacle
120 Processing facility
125 Transmission facility
130 Receive facility
135 Sensor
140 Storage device
145 Point
200 Method
205 Transmit measurement signal
210 Receive reflection
215 Allocate point
220 Allocate point of a tile
225 Determine NDT for a tile
230 Discard a tile having noisy points
235 Discard points at a distance from the average point
240 Determine map of the surroundings
305 Variance
310 First eigenvector
315 Second eigenvector

The invention claimed is:

1. A method for creating a map of the surroundings for a mobile household appliance, the method comprising:

transmitting a measurement signal into the surroundings of the household appliance and receiving reflections of the measurement signal;

determining points in the surroundings that are allocated a reflection of the measurement signal;

determining a spatial distribution of the points in the surroundings;

dividing the surroundings into tiles of a predetermined size;

identifying points with a distance to an average location of the points exceeds a predetermined value;

identifying points of a tile of the tiles with a spatial distribution of the points of the tile corresponds less than a predetermined amount to a straight line;

checking whether all the points of a whole tile have been identified and discarding the points of a whole tile, subsequently discarding individually identified points, and retaining remaining points; or discarding individually identified points, and subsequently checking whether all the points of a whole tile have been identified and discarding the points of a whole tile, and retaining remaining points;

creating the map of the surroundings on a basis of the remaining points; and storing the map of the surroundings in a storage device in the mobile household appliance, and the map being configured to inform a navigation of the mobile household appliance in the surroundings.

2. The method according to claim 1, which comprises determining a normal distribution transformation NDT for the points of a tile, the normal distribution transformation indicating an average location of the points and a variance of the points.

3. The method according to claim 1, which comprises:
determining each of the points in two dimensions;
with a variance of the points of a tile including two eigenvectors;
determining eigenvalues of the eigenvectors; and
discarding the points of a tile for which a ratio between a larger eigenvalue and a smaller eigenvalue deviates from one by more than a predetermined amount.

4. The method according to claim 1, which comprises:
determining each of the points in two dimensions;
with a variance of the points of a tile including two eigenvectors;
determining eigenvalues of the eigenvectors; and
discarding the points of a tile if one of the eigenvalues exceeds a predetermined value or undershoots a predetermined value.

5. The method according to claim 1, which comprises:
dividing the surroundings into tiles of a predetermined size; and
discarding a point that is allocated to a tile if a distance of the point to an average location of the points of the tile exceeds the predetermined value.

6. The method according to claim 5, which comprises determining a normal distribution transformation NDT for the points of a tile, the normal distribution transformation NDT indicating an average location of the points and a variance of the points.

7. The method according to claim 6, which comprises:
determining each of the points in two dimensions;
the variance of the points of a tile including two eigenvectors;
determining eigenvalues of the eigenvectors; and
discarding the points of a tile for which a ratio between a larger eigenvalue and a smaller eigenvalue deviates from one by more than a predetermined amount.

8. The method according to claim 6, which comprises:
determining each of the points in two dimensions;
the variance of the points of a tile including two eigenvectors;
determining eigenvalues of the eigenvectors; and discarding the points of a tile if one of the eigenvalues exceeds a predetermined value or undershoots a predetermined value.

9. The method according to claim 6, which comprises determining the distance of a point by determining a Mahalanobis distance of the point to the average location of the points.

10. An apparatus for determining a map of the surroundings for a mobile household appliance, the apparatus comprising:
a transmitter for transmitting a measurement signal into the surroundings of the household appliance;
a receiver for receiving reflections of the measurement signal; and
a processor connected to said receiver, said processor being configured to:
determine points in the surroundings which are allocated a reflection of the measurement signal;
determine a spatial distribution of the points in the surroundings;
divide the surroundings into tiles of a predetermined size;
identify points with a distance to an average location of the points exceeds a predetermined value;
identify points of a tile of the tiles with a spatial distribution of the points of the tile corresponds less than a predetermined amount to a straight line;
check whether all the points of a whole tile have been identified and discarding the points of a whole tile, and subsequently discarding individually identified points, and retaining remaining points; or discarding individually identified points, and subsequently checking whether all the points of a whole tile have been identified and discarding the points of a whole tile, and retaining remaining points; and
determine the map of the surroundings on a basis of the remaining points, the map being configured to inform a navigation of the mobile household appliance in the surroundings; and
a storage device for storing the map of the surroundings in a storage device in the mobile household appliance.

11. The apparatus according to claim 10, which comprises a LiDAR sensor forming said transmitter and said receiver.

12. A floor cleaning robot, comprising the apparatus according to claim 10 for determining a map of the surroundings of the floor cleaning robot.

* * * * *